United States Patent
Shipton et al.

(10) Patent No.: US 7,527,874 B2
(45) Date of Patent: May 5, 2009

(54) METHOD OF FORMING A VIBRATION DAMPING COATING ON A METALLIC SUBSTRATE

(75) Inventors: Mark Henry Shipton, Bristol (GB); Sophoclis Patsias, Cheshire (GB)

(73) Assignee: Rolls-Royce PLC, London (GB)

( * ) Notice: Subject to any disclaimer, the term of this patent is extended or adjusted under 35 U.S.C. 154(b) by 494 days.

(21) Appl. No.: 10/531,945

(22) PCT Filed: Oct. 8, 2003

(86) PCT No.: PCT/GB03/04359

§ 371 (c)(1), (2), (4) Date: Apr. 19, 2005

(87) PCT Pub. No.: WO2004/046414

PCT Pub. Date: Jun. 3, 2004

(65) Prior Publication Data

US 2005/0260425 A1 Nov. 24, 2005

(30) Foreign Application Priority Data

Nov. 15, 2002 (GB) ................. 0226692.2

(51) Int. Cl.
*B32B 9/00* (2006.01)
*C23C 4/10* (2006.01)

(52) U.S. Cl. .............. 428/469; 428/701; 428/702; 428/357; 427/453

(58) Field of Classification Search ........... 428/469
See application file for complete search history.

(56) References Cited

U.S. PATENT DOCUMENTS

| 3,927,223 A | 12/1975 | Takabatake et al. |
| 5,525,211 A * | 6/1996 | Sudhakar et al. ........... 208/217 |
| 6,379,526 B1 * | 4/2002 | de Nora et al. ............. 205/384 |
| 2002/0122718 A1 | 9/2002 | Motherwell et al. |

FOREIGN PATENT DOCUMENTS

| JP | A-06-345551 | 12/1994 |
| WO | WO 01/00539 A2 | 1/2001 |

OTHER PUBLICATIONS

G. Lallemand et al.; "Fabrication Process of Spinel Powder for Plasma Spraying"; *Journal of the European Ceramic Society*; vol. 18, No. 14; Dec. 1, 1998; pp. 2095-2100.

* cited by examiner

*Primary Examiner*—Timothy M Speer
(74) *Attorney, Agent, or Firm*—Oliff & Berridge, Plc.

(57) ABSTRACT

A method of forming a vibration damping coating on a metallic substrate, eg a titanium alloy aerospace component, comprises applying to the metallic substrate a coating comprising a spinel having regions of relative oxide or nitride imbalance.

24 Claims, 3 Drawing Sheets

METHOD OF FORMING A VIBRATION DAMPING COATING ON A METALLIC SUBSTRATE

Figure 1:
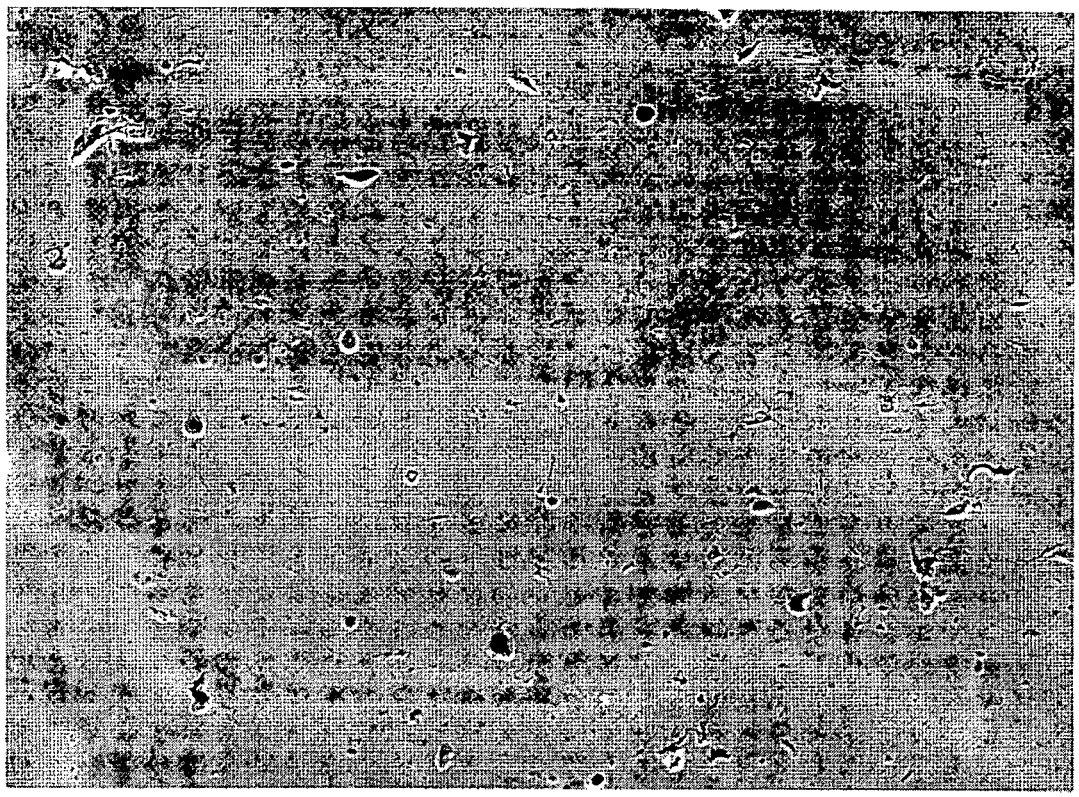

The present invention relates to a method of forming a vibration damping coating on a metallic substrate, and particularly but not exclusively a method of forming a vibration damping coating on an aerospace component such as a part of a gas turbine engine. The invention also relates to a vibration damped structure comprising the coating and to a material usable as a starting material for forming the coating.

It is generally known to damp vibrations in metallic substrates by use of a surface coating on the substrate.

US-A-2002/0122718, the disclosure of which is incorporated herein by reference, discloses the use of magnesia-alumina spinel as a vibration reducing coating on a tip treatment bar of a gas turbine engine.

The present invention is based on our surprising finding that, by controlling the microstructure of a spinel coating in certain defined ways, the damping efficiency of the coating can be improved.

According to a first aspect of the present invention, there is provided a method of forming a vibration damping coating on a metallic substrate comprising applying to a surface of the metallic substrate by plasma spraying a coating comprising a spinel having regions of relative oxide or nitride imbalance; said spinel further characterised by the presence of at least about 85,000 effective interface and defect zones per square millimeter, or at least about 100,000 orientated grain boundaries and microcracks per square millimeter, or both.

The coating may be applied to the metallic substrate in one or more application steps. It is preferred that the coating is applied to the substrate in one application step.

The metallic substrate preferably comprises an aerospace component or a portion thereof, eg a titanium alloy aerospace component or portion thereof.

According to a second aspect of the present invention, there is provided a vibration-damped structure comprising a metallic substrate and a vibration damping coating bonded to said substrate by plasma spraying wherein the coating comprising a spinel having regions of relative oxide or nitride imbalance, said spinel further characterised by the presence of at least about 85,000 effective interface and defect zones per surface square millimeter, or at least about 100,000 orientated grain boundaries and microcracks per surface square millimeter, or both. The surface density of effective interface and defect zones and orientated grain boundaries and microcracks are measurable by standard techniques, such as, for example, scanning electron microscopy.

According to a third aspect of the present invention, there is provided a particulate spinel material wherein at least some of the particles have a relative oxide or nitride imbalance with respect to other ones of the particles, or wherein at least some of the particles have regions of relative oxide or nitride imbalance within the particle, or both. Such a material is useful as a starting material in the coating application process, as will be described in greater detail below.

The spinel coating according to the present invention may suitably be applied using conventional thermal spray techniques, eg plasma spraying, more particularly plasma spraying with control of one or more of plasma enthalpy, powder injection dynamics and substrate temperature. The process parameters can readily be adjusted by those skilled in the art, to suit the equipment used.

According to a fourth aspect of the present invention, there is provided the use of a spinel having regions of relative oxide or nitride imbalance in a surface coating of a metallic substrate, for the purpose of damping vibrations in the metallic substrate.

According to a fifth aspect of the present invention, there is provided use of a spinel having regions of relative oxide or nitride imbalance in a surface coating of a metallic substrate when the spinel is applied to said substrate by plasma spraying to form a coating characterised by the pressure of at least about 85,000 effective interface and defect zones per surface square millimeter, or at least about 100,000 orientated grain boundaries and microcrack per surface square millimeter, or both; said coating being for the purpose of damping vibrations in the metallic substrate.

The term "regions of relative oxide or nitride imbalance" used herein means that at certain (preferably very numerous) locations of the coated surface area the proportions of the oxide components of the spinel will vary from the stoichiometric spinel ratio; or that at certain (preferably very numerous) locations of the coated surface area at least one introduced nitride and/or oxide may be present in the spinel coating; or both.

The term "relative oxide or nitride imbalance" used herein with respect to the particulate spinel starting material has a corresponding meaning applied to different particles within a population.

The terms "oxide" and "nitride" used herein with respect to the particulate spinel starting material include precursors of oxides and nitrides, which can be converted into oxides or nitrides in the coating application method. In particular, a carbonate can be used in the particulate spinel starting material as a precursor of the corresponding oxide (eg calcium carbonate can be used as a precursor of calcium oxide).

The term "introduced nitrides and/or oxides" used therein means one or more nitride or oxide which is foreign to the spinel coating, in addition to the spinel material. An introduced nitride or oxide may suitably be a nitride or oxide having a coefficient of thermal expansion which is different from, preferably substantially different from, and most preferably substantially greater than, the coefficient of thermal expansion of the spinel material. More preferably, the introduced nitride or oxide should affect the volume and morphology of defects arising within the coating structure and influence the frictional behaviour of defect interface surfaces so that the amount of vibrational energy absorbed by the defect interface surface is maximised.

The term "surface" used herein includes any portion of the total surface of the substrate.

The term "coating" used herein includes coatings which contact the surface of the metallic substrate, those which are spaced from the metallic substrate by one or more interposed material, and those which are overlain by any top coating.

The spinel material may be present with additional component materials in the coating, or the coating may consist essentially of the spinel material according to the invention.

The presence of regions of relative oxide or nitride imbalance in the spinel coating is believed to result in a very much increased concentration of effective interface and defect zones, oriented grain boundaries and microcracks in the coating, in comparison with conventional spinel coatings. Without wishing to be bound by theory, we believe that this effect may arise, at least in part, from (a) differential expansions and contractions within the spinal material both in the thermal spray and on the metallic substrate, during heating and cooling phases of the application procedure, (b) defect centres, embryo sites or initiation sites caused by introduced oxides and/or nitrides, (c) zone interface films caused by nitride and/or oxide components which phase separate from the spinel material, eg forming splat interfaces or elongated stringers; or (d) any combination thereof. Such defect etc. zones are believed to exert a highly efficient energy absorption effect within the coating, leading to very good damping of vibration.

The metallic substrate may comprise any metal or metal alloy and is suitably of relatively low density, for example less than about 7 gcm$^{-3}$, less than about 6 gcm$^{-3}$ or less than about 5 gcm$^{-3}$. The metallic substrate suitably has a relatively high melting point or melting range. For example, the melting point or midpoint of the melting range may suitably be above about 1000° C., for example above about 1300° C., more preferably above about 1400° C., and most preferably above about 1500° C.

The metal substrate may comprise a first metal as the main component and any other suitable metal or metals as a further component or components. It will be appreciated that the metallic substrate may also comprise semi- and non-metallic components in addition to metallic components. These semi- and non-metallic components may typically be present in lower amounts than the main metallic component, for example less than about 5% by weight, less than about 3% by weight or less than about 1% by weight.

The main component of the metallic substrate preferably comprises a transition metal or a transition metal alloy. The metallic substrate preferably comprises titanium, an alloy of titanium, steel or stainless steel. In a preferred embodiment, the metallic substrate comprises a titanium alloy substantially in the beta form.

In the case where the metal substrate is a titanium alloy, it will comprise titanium as the main component and preferably one or more subsidiary components selected from the group consisting of aluminium, beryllium, bismuth, chromium, cobalt, gallium, hafnium, iron, manganese, molybdenum, niobium, nickel, oxygen, rhenium, tantalum, tin, tungsten, vanadium and zirconium. This alloy may also suitably comprise one or more semi- or non-metallic elements selected from the group consisting of boron, carbon, silicon, phosphorous, arsenic, selenium, antimony and tellurium. These elements may serve to increase the oxidation, creep or burning resistance of the metallic substrate.

Titanium may be present in such a titanium alloy in an amount greater than about 40% by weight, for example greater than about 50% by weight, greater than about 60% by weight or greater than about 70% by weight and in some embodiments may be present in an amount greater than about 80% by weight.

The amount in which the subsidiary component or components are present is determined by the use to which the metallic substrate will be put, as will be well understood by those skilled in this art. For example, the metallic substrate may be a ternary alloy comprising titanium, vanadium and chromium. Certain compositions of this type are especially preferred for certain applications wherein the titanium is present substantially in the beta form under most temperature conditions ie has less than about 3 wt % alpha phase titanium, preferably less than about 2 wt % alpha phase titanium. Such beta titanium alloys are based on ternary compositions of titanium-vanadium-chromium which occur in the titanium-vanadium-chromium phase diagram bounded by the points Ti-22V-13Cr, Ti-22V-36Cr, and Ti-40V-13Cr. These compositions are known to have useful mechanical properties such as high creep strength and a lack of combustibility at temperatures of up to at least about 650° C. In such compositions, the titanium is preferably present in an amount greater than about 40% by weight, for example greater than about 50% by weight. The chromium is preferably present in an amount greater than about 10% by weight, for example greater than about 15% by weight or greater than about 25% by weight. This concentration of chromium is necessary to provide the required non-burning characteristics of the alloy at these high temperatures. Vanadium may be present in an amount greater than about 20% by weight, for example greater than 25% by weight or greater than about 30% by weight. A specific alloy of this type has a composition comprising about 50 wt % titanium, about 35 wt % vanadium and about 15 wt % chromium.

In other applications, the elements of the alloy composition will be significantly different. For example, the metallic substrate may comprise an alloy comprising titanium and other metals or semi-metals selected from the group consisting of aluminium, chromium, copper, iron, molybdenum, niobium, silicon, tin, vanadium and zirconium. In such alloys, aluminium is preferably present in an amount less than 10 wt %, for example less than 8 wt %; chromium is preferably present in an amount less than 10 wt %, for example less than 8 wt %; copper is preferably present in an amount less than 5 wt %, for example less than 3 wt %; iron is preferably present in an amount less than 5 wt %, for example less than 3 wt %; molybdenum is preferably present in an amount less than 10 wwt %, for example less than 8 wt %; niobium is preferably present in an amount less than 6 wwt %, for example less than 4 wt %; silicon is preferably present in an amount less than 2 wwt %, for example less than 1 wt %; tin is preferably present in an amount less than 16 wt %, for example less than 12 wt %; vanadium is preferably present in an amount less than 15 wt %, for example less than 10 wt %; and zirconium is preferably present in an amount less than 8 wt %, for example less than 6 wt %. A specific example of such an alloy is Ti-6Al-4V.

Titanium alloys are known to be generally susceptible to oxidation damage through the formation of the so-called α-case oxide layer. The diffusion barrier established according to the present invention is found to substantially restrict such oxidation damage in titanium alloys.

A spinel is a mixed metallic oxide, which in its stoichiometrically balanced form has the general formula $AB_2O_4$, where A represents a divalent cation and B represents a trivalent cation. Examples of suitable divalent cations include $Fe^{2+}$, $Mg^{2+}$, $Cu^{2+}$ and $Mn^{2+}$. Examples of suitable trivalent cations include $Cr^{3+}$, $Fe^{3+}$, and $Al^{3+}$.

The stoichiometrically balanced material may thus be considered as an equimolar combination of the fundamental oxides AO and $B_2O_3$.

The crystalline structure of a balanced spinel is typically characterised by a cubic system, in which the metal atoms exist in tetrahedral and octahedral coordination. In a so-called normal spinel structure, each A atom is coordinated with four oxygen atoms (ie in tetrahedral coordination), and each B atom is coordinated with six oxygen atoms (ie in octahedral coordination). In a so-called inversed spinel, the tetrahedral positions are occupied by some of the B atoms, whilst the A atoms and the remainder of the B atoms are distributed throughout the octahedral positions. All crystalline forms are embraced by the term "spinel" as used herein.

Spinel materials are characteristically described as ceramics. They are relatively inert to acid or base attack, and relatively refractory to heat.

The preferred spinel for use in the present invention is magnesia-alumina spinel, ie $A=Mg^{2+}$ and $B=Al^{3+}$. The term "magnesia-alumina spinel" used herein includes materials in which $MgAl_2O_4$ is the predominant component, ie comprising more than about 50% by weight of the material, and in particular does not exclude impure or mixed materials which can nevertheless fairly be described as magnesia-alumina spinel.

Where the spinel coating has an unbalanced stoichiometry to provide the required regions of relative oxide or nitride imbalance according to the present invention, a molar excess of a di- or tri-valent metal oxide, preferably one of the same oxides AO and $B_2O_3$ which on which the spinel is based (preferably magnesia and alumina), is also present, the molecules of which disrupt the bulk crystalline structure described above. Generally speaking, the molar excess of the oxide may be within about 7%, more typically within about 5% of equimolar. It is preferred that the degree of imbalance is such that the excess oxide is present in a molar excess amount between about 0.2 and about 7%, for example between about 0.5 and about 5%, for example between about 1 and about 5%, of equimolar. Such a spinel coating may be termed a "heterogeneous" spinel.

Where the spinel coating includes at least one introduced nitride and/or oxide to provide the required relative oxide or nitride imbalance according to the invention, the introduced nitride and/or oxide may be selected from the nitrides and oxides of: zirconium, yttrium, silicon, aluminium, calcium, titanium, boron, hafnium, tungsten, nickel, niobium, iron, chromium, titanium, vanadium, manganese, molybdenum, cerium, cobalt, barium, praseodymium, neodymium, samarium, gadolinium, erbium and strontium. Introduced nitrides or oxides will suitably be present in amounts up to about 40% by total weight of the coating material, for example up to about 20% by total weight.

An introduced nitride and/or oxide may be incorporated into the spinel as a solid solution, or may reside within a surrounding spinel matrix.

The coating may be applied to the metallic substrate by any convenient method. A range of alternatives will be known to those skilled in this art.

The substrate may initially be prepared for coating in conventional manner, eg peening, degreasing and other surface treatments.

In one preferred method, a particulate spinel material according to the third aspect of the present invention is initially prepared, and is then used to deposit the coating onto the metallic substrate. The preferred deposition technique is plasma spraying, which is a well-known technique in the art. In essence, a powder is entrained in a very high temperature plasma flame, where it is rapidly heated to a molten or softened state and accelerated to a high velocity. The hot material passes through a nozzle and impacts on the substrate surface, where it rapidly cools, forming the coating. It is preferred that a so-called "cold plasma spraying" process is used, whereby the temperature of the material impacting the substrate is maintained sufficiently low to avoid heat damage to the substrate.

The plasma spraying procedure is typically performed using a conventional plasma spraying apparatus comprising an anode (eg of copper) and a cathode (eg of tungsten), both of which are cooled (eg by water). Plasma gas (eg argon, nitrogen, hydrogen or helium) flows around the cathode and through the anode. The anode is formed into a constricting nozzle, through which the plasma stream and powder particles are ejected. The plasma is initiated by a high voltage discharge, which causes localised ionisation and a conductive path for a DC (direct current) electric arc to form between the cathode and the anode. The resistance heating from the arc causes the gas to reach extreme temperatures, dissociate and ionise to form a plasma. The plasma then exits the anode nozzle as a free or neutral plasma flame (ie plasma which does not carry any electric current). The spinel powder is fed into the plasma flame, typically via an external powder port positioned close to the anode nozzle.

The plasma spraying apparatus is normally located between about 25 and about 150 mm from the metallic substrate surface.

The resultant spinel coating is preferably in the form of a surface layer overlying the metallic substrate, the layer being typically substantially continuous and of substantially uniform thickness. The thickness of the coating may depend on factors such as the severity of the vibrations and the ambient conditions to which the coated metallic substrate will be exposed. The coating preferably has a thickness of greater than about 100 µm, for example greater than about 300 µm, and up to about 2 mm. Typically, the coating will have a thickness less than about 700 µm, eg an average thickness of about 500 µm.

As stated above, the powder material for use in the plasma spraying process is novel and constitutes a further aspect of the present invention.

The particles may typically have an average effective diameter greater than about 10 µm, for example greater than about 20 µm. Normally, the average particle size will be less than about 150 µm, for example less than about 100 µm, eg about 30 to 80 µm. In the case of non-spherical particles, effective diameter is expressed as the "equivalent spherical diameter" of the particle, as will be well understood by those skilled in this art. Particle size may be measured by any technique commonly used in the art, for example dynamic light scattering or transmission electron microscopy.

The particulate material preferably consists essentially of the particles as defined in the third aspect of the present invention.

The spinel material of the powder may comprise spinel material in which a di-valent or tri-valent metal oxide of the spinel, or an introduced oxide and/or nitride, is in a molar excess. The particulate material may also comprise small amounts of non-spinel material, eg nucleating core materials which can assist in the manufacture of the particles. Such additional materials, if present, will generally be present in an amount less than about 10% by weight, for example less than about 5% by weight. Particles containing such levels of additional materials in addition to the spinel material will still be considered as consisting essentially of spinel material.

As mentioned above, precursor forms of introduced oxides or nitrides can be used in the particulate spinel material. For example, calcium carbonate can be used as a precursor of calcium oxide. The expression "introduced oxide and/or nitride" and like expressions used in relation to the particulate spinel material are to be understood accordingly.

In one particular embodiment, the powder comprises, and preferably consists essentially of, in admixture, a first particulate spinel material in which one of the oxides of the spinel and/or an introduced oxide and/or nitride is in a molar excess and a second particulate spinel material in which the other of the oxides of the spinel and/or an introduced oxide and/or nitride is in a molar excess, optionally together with further particulate spinel materials of different composition whether stoichiometrically balanced or unbalanced. Preferably at least two such materials will be present in the mixture. The particulate materials are preferably present in intimate admixture for use in the application procedure for the present invention. The particulate materials may have substantially different particle sizes, whereby a densified composite powder is provided, or may have substantially similar particle sizes, whereby a composition blend is provided.

Where two particulate materials are present and have substantially different particle sizes, one may suitably have an average particle size of around 100 μm and the other may suitably have an average particle size of around 20 μm.

Such particulate materials for use in the present invention may be prepared by any suitable method known in the art. The particulate spinel material may, for example, be prepared by fusing an appropriate molar ratio of the constituent oxides, allowing the fused material to cool, and subsequently comminuting (eg by crushing) the cooled fused material to obtain the desired powder. Alternatively, the particulate spinel material may be prepared by precipitation in generally known manner. Alternatively, the particulate spinel material may be prepared by spray drying from a slurry composition formed with agitation (eg flow agitation) using a liquid carrier (eg an aqueous carrier) containing suitable additional components such as surfactants, organic binders, or combinations thereof. In a still further alternative, the particulate spinel material can be formed by gas atomisation in conventional manner.

In a second particular embodiment, the powder comprises, and preferably consists essentially of, particles comprising internal domains (eg cores and/or layers) of a first spinel material in which one of the oxides of the spinel and/or an introduced oxide and/or nitride is in a molar excess and a second spinel material in which the same oxide is present in a different molar excess or the other of the oxides of the spinel and/or an introduced oxide and/or nitride is in a molar excess, optionally together with further such spinel domains of different spinel composition whether stoichiometrically balanced or unbalanced.

The particulate material of this second particular embodiment may conveniently be formed by a sol-gel process. The sol-gel process can be performed in an aqueous or organic liquid medium, or in a mixed aqueous/organic liquid medium. A sol is initially formed in the medium, comprising a stable dispersion of very fine particles of the component oxides and/or nitrides or their chemical precursors. The particles of the sol are of a size capable of being suspended without sedimentation, under the effects of Brownian motion. The particles will typically have sizes less than about 1 μm.

The particles are preferably chemical precursors of the intended oxides and/or nitrides of the desired material. Such precursors can be insoluble or sparingly soluble salts or organometallic compounds (eg alkoxides) of the metals, provided that the precursor exists in particle sizes small enough to allow the sol to be formed and the precursors will be converted into metal oxides under the subsequent gelation treatment, which typically involves dehydration and/or basification (raising of the pH). By "insoluble or sparingly soluble" we mean a material the saturated solution of which in the medium in question is less than about 0.1M at 20° C.

By controlling the chemistry balance of the sol-gel mixture, it is possible to precipitate an alternating spinel chemistry on existing particulates.

The method of manufacturing the particulate spinel material used to deposit the coating on the metallic substrate is suitably controlled, so that the prepared particles deposit on the substrate with a relatively high surface concentration of grain boundaries, microcracks, interface and defect zones, zone interface films, defect centres, embryo sites, initiation sites, splat interfaces, elongated stringers, or any combination thereof.

In one particular embodiment, the particle sizes may be relatively fine, eg having an average particle size less than about 50 μm, which causes the particles to melt easily in the application flame. In another particular embodiment, such relatively fine particles may be agglomerated to form particulate agglomerates which disintegrate or fragment in the application flame to provide the desired stream of molten particles for the application of the coating to the substrate. Agglomeration of particles may be achieved using any suitable techniques from the powder handling and powder coating and cladding arts, including without limitation granulation or powder cladding (eg using an organic binder medium to bind particles together), and consolidation (eg plasma consolidation, to bind particles together with agglomeration and partial sintering).

Densification of powder material obtained by means of any of the foregoing processes can be accomplished, for example, by heating in an inert atmosphere. Grading of particle sizes can conveniently be achieved, for example, by sieving.

The particulate material for use in the method of the present invention is preferably provided as a dry, preferably flowable, powder, for ease of storing and handling.

Where the metallic substrate comprises an aerospace component or portion thereof, the component is preferably a component of an aero-engine, eg one which in use is exposed to vibrational forces and may be exposed to conditions of relatively high temperature (eg above about 400° C., particularly above about 650° C.), eg casings, shrouds, compressor drums, vanes, discs, blades, shafts, plugs or nozzles.

The coating is also intended for use at relatively cool temperatures (eg about 300° C.). The coating of the present invention is not sensitive to temperature (ie its properties remain effectively constant over a large range of temperatures). This provides an advantage over vibration damping coating designed for use over specific and limited temperature ranges. For example a coating designed for vibration damping on components operable at high temperatures (such as, by way of non limiting example, glasses) tend to provide considerably less vibration damping at lower temperatures. Conversely coatings designed for use at relatively low temperatures (such as, by way of non limiting example, visco elastic based damping materials) are very sensitive to temperature changes and will not provide damping at relatively high temperatures and may even be permanently damaged by high temperatures.

The present invention provides an improved or at least alternative method for protecting metallic substrates (eg titanium alloys) against vibration damage, particularly in high vibration environments such as aero-engines.

The ceramic spinel coating enabled by the present invention is found to be substantially inert and has sufficient strength and resistance to cracking to maintain its integrity under the wear and vibration conditions typically found in aero-engines. It does not interact adversely with the metallic substrate to an appreciable extent. It is also resistant to erosion and cracking under repeated cycling from low to high temperatures.

By way of non-limiting exemplification, a magnesia-alumina spinel coating containing a small amount (approximately 3.5 or 5 weight percent of the particulate coating material as applied to the plasma spray) of added calcium carbonate was applied by plasma spraying to a Ti-6Al-4V metallic substrate, and the surface defect morphology was investigated by scanning electron microscopy (SEM), in comparison with a standard magnesia-alumina spinel.

FIG. 1 of the accompanying drawings shows the surface of the standard spinel coating under secondary electron field SEM at 1000× magnification.

Figure 2:
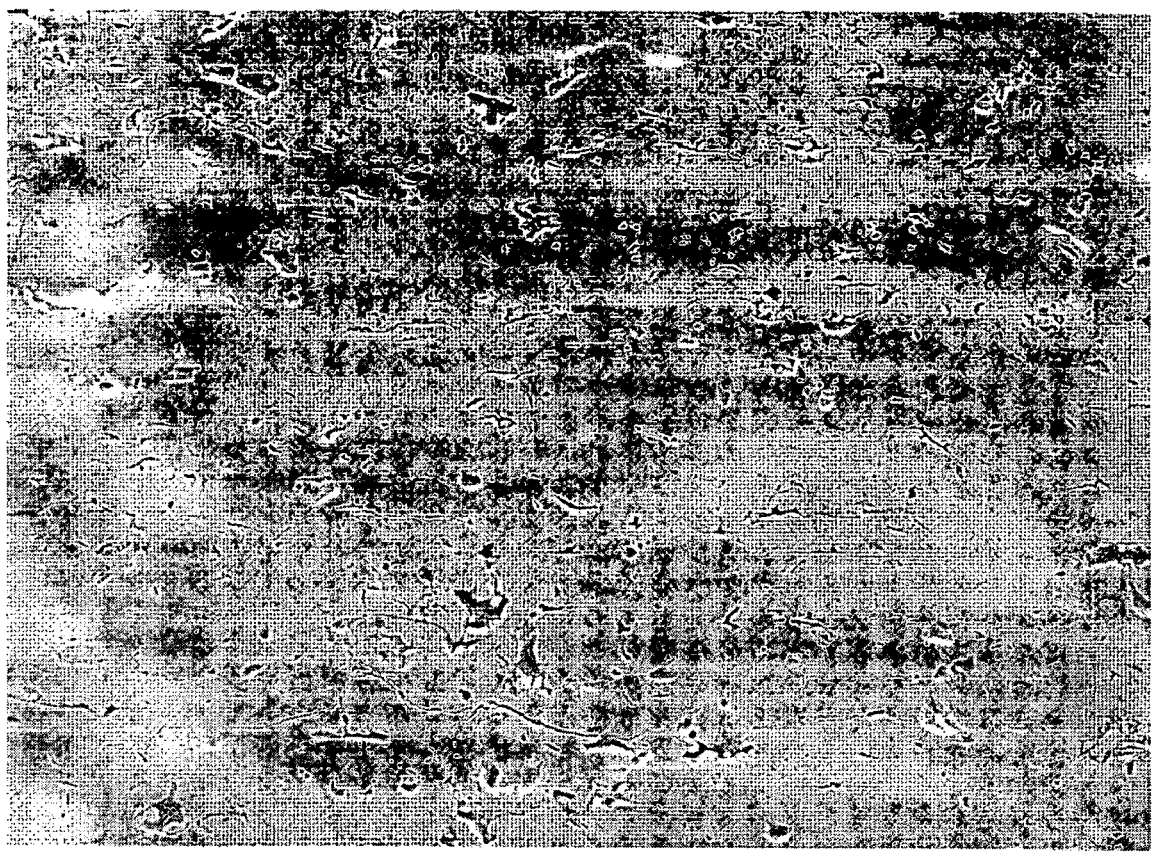

FIG. 2 of the accompanying drawings shows the surface of the calcium oxide modified spinel coating under secondary electron field SEM at 1000× magnification.

Figure 3:
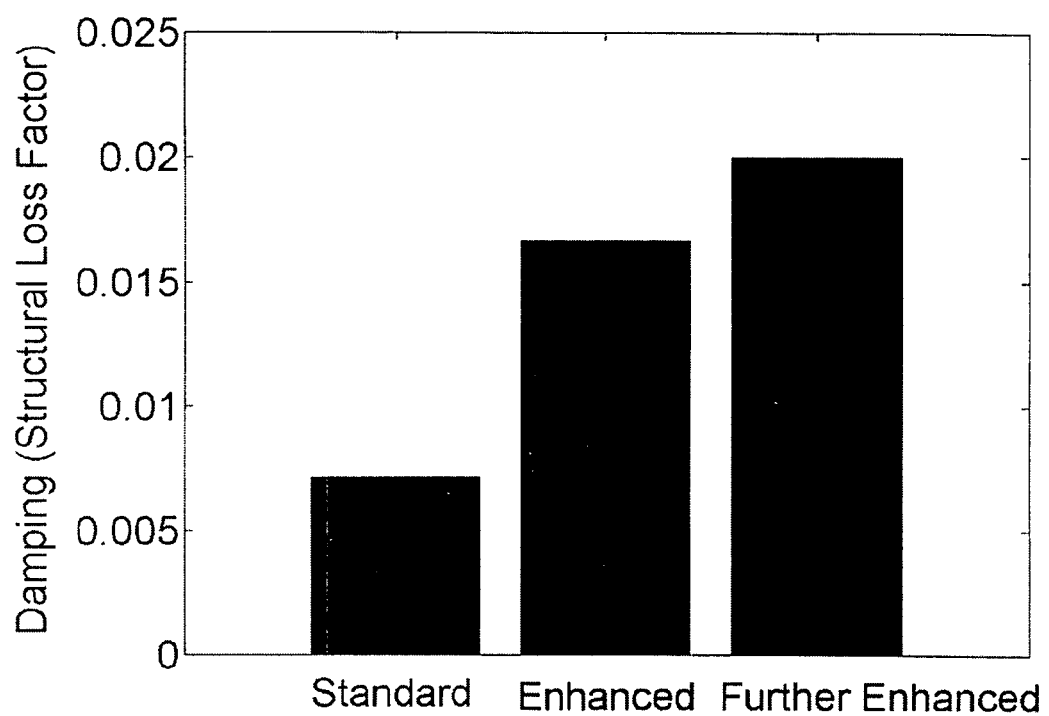

FIG. 3 of the accompanying drawings shows the structural loss factor observed under standard vibration damping tests performed on the material of FIG. 1 ("Standard"), the material of FIG. 2 ("Enhanced—about 3.5 wt-%") and a further material containing a larger amount of calcium oxide ("Further Enhanced—about 5 wt-%").

In this particular example a suitable base MgAl spinel powder was used which is manufactured for the purpose of thermal spraying. A suitable product is supplied by Sulzer Metco designated 'AE7443'. The enhanced or further enhanced coating powder was produced by adding approximately 3.5 or 5 weight percent of an analytical reagent grade calcium carbonate as a physical mixture. A suitable product is available from Mallinckrodt Chemicals designated 'Calcium Carbonate 4072'.

The specimen surface was prepared for spraying to achieve a suitable surface roughness using abrasive blasting using nominal 80 mesh alumina media with a nozzle pressure of ~40 psi.

A suitable high energy plasma spray gun was used (>40 KW). Such a product is available from Sulzer Metco designated 'F4'. Application parameters to achieve a suitable microstructure have to be established for a particular equipment and specimen/component geometry combination. These parameters are established via suitable spray trials as those skilled in the art would be familiar. Parameters controlled to achieve suitable structure were spray distance, primary, secondary gas flow, Ar/H2 ratio and supply voltage.

The test rig is comprised of the following items:
1) Laptop computer, running MATLAB environment and custom test and analysis routines
2) SigLab Measurement System (Data Acquisition)
3) MicroEpsilon Laser Displacement Device In a typical test, a standard specimen (straight beam) is secured in a custom made clamp. The tip of the beam is then deflected to a set amplitude. SigLab, a two channel measuring system, is used to record the displacement signal of the laser displacement probe (MicroEpsilon-optoNCDT) measuring the amplitude of the vibration. SigLab runs through MATLAB, which is the same programming environment used to analyse the captured data. The analysis routines estimate the damping of the coated beam at that strain level using the Logarithmic Decrement method (see Thomson, William T. (William Tyrrell).—Theory of vibration with applications.—3rd ed.—London, 1988).

As shown in the Figures, the coating of the present invention provides substantially improved vibrational damping, and a substantial increase in the concentration of defect zones in the coating.

The above broadly describes the present invention without limitation. Variations and modifications as will be readily apparent to those skilled in this art are intended to be included in the scope of this application and any resultant patents.

The invention claimed is:

1. A method of forming a vibration damping coating on a metallic substrate comprising applying to a surface of the metallic substrate by plasma spraying a coating comprising a spinel having regions of oxide or nitride that vary from a stoichiometric spinel ratio, or regions of oxide and nitride that vary from a stoichiometric spinel ratio; said spinel further comprising calcium oxide; and said spinel further comprising at least about 85,000 effective interface and defect zones per square millimeter, or at least about 100,000 orientated grain boundaries and microcracks per square millimeter, or both.

2. A method according to claim 1, wherein the metallic substrate comprises a titanium alloy.

3. A method according to claim 1, wherein the spinel includes a molar excess of one of the oxides on which the spinel is based.

4. A method according to claim 1, wherein the molar excess of the oxide is within about 7% of equimolar.

5. A method according to claim 1, wherein the spinel includes at least one introduced nitride and/or oxide.

6. A method according to claim 5, wherein the introduced oxide and/or nitride is selected from nitrides and oxides of: zirconium, yttrium, silicon, aluminum, calcium, titanium, boron, hafnium, tungsten, nickel, niobium, iron, chromium, titanium, vanadium, manganese, molybdenum, cerium, cobalt, barium, praseodymium, neodymium, samarium, gadolinium, erbium and strontium.

7. A method according to claim 5, wherein the introduced nitride and/or oxide is present in an amount up to about 40% by total weight of the coating material.

8. A method according to claim 1, wherein the spinel is magnesia-alumina spinel.

9. A vibration-damped structure comprising a metallic substrate and a vibration damping coating applied to said substrate by plasma spraying, wherein the coating comprises
a spinel having regions of oxide or nitride that vary from a stoichiometric spinel ratio, or regions of oxide and nitride that vary from a stoichiometric spinel ratio,
calcium oxide, and
at least about 85,000 effective interface and defect zones per surface square millimeter, or at least about 100,000 orientated grain boundaries and microcracks per surface square millimeter, or both.

10. A structure according to claim 9, which comprises an aerospace component or a portion thereof.

11. A vibration-damped structure comprising a metallic substrate and a vibration damping coating applied to said substrate by plasma spraying, wherein the coating comprises
a spinel having regions of oxide or nitride that vary from a stoichiometric spinel ratio, or regions of oxide and nitride that vary from a stoichiometric spinel ratio,
calcium oxide, and
at least about 85,000 effective interface and defect zones per surface square millimeter, or at least about 100,000 orientated grain boundaries and microcracks per surface square millimeter, or both,
wherein the vibration-damped structure is produced by a method according to claim 1.

12. A particulate spinel material comprising (1) at least one particle having oxide or nitride that varies from a stoichiometric spinel ratio within the particle, or at least one particle having regions of oxide and nitride that vary from a stoichiometric spinel ratio within the particle, (2) calcium oxide, and (3) at least about 85,000 effective interface and defect zones per surface square millimeter, or at least about 100,000 orientated grain boundaries and microcracks per surface square millimeter, or both.

13. A particulate spinel material according to claim 12, wherein the at least one particle having oxide or nitride that varies from a stoichiometric spinel ratio within the particle, or the at least one particle having regions of oxide and nitride that vary from a stoichiometric spinel ratio within the particle is provided by a precursor of an oxide or nitride, respectively, which precursor is capable of being converted to an oxide or nitride in a coating application method.

14. A particulate spinel material according to claim 13, wherein calcium carbonate is present as a precursor of calcium carbonate.

15. A particulate spinel material according to claim 12, which comprises said particles, optionally together with particles of stoichiometrically balanced spinel material.

16. A particulate material according to claim 12, wherein the particles are sufficiently fine to melt in a plasma flame during a process of application to coat a metallic substrate.

17. A particulate material according to claim 12, wherein the particles are in the form of particulate agglomerates of smaller particles which can disintegrate or fragment in a plasma flame during a process of application to provide in the flame a stream of molten particles for an application of a coating to a substrate.

18. A particulate material according to claim 12, in the form of a dry powder.

19. A particulate material according to claim 12, comprising in admixture a first particulate spinel material in which one of the oxides of the spinel and/or an introduced oxide and/or nitride is in a molar excess and a second particulate spinel material in which the other of the oxides of the spinel and/or an introduced oxide and/or nitride is in a molar excess, optionally together with further particulate spinel materials of different composition whether stoichiometrically balanced or unbalanced.

20. A particulate material according to claim 19, comprising said particulate spinel materials.

21. A particulate material according to claim 12, comprising particles comprising internal domains of a first spinel material in which one of the oxides of the spinel and/or an introduced oxide and/or nitride is in a molar excess and a second spinel material in which the same oxide is present in a different molar excess or the other of the oxides of the spinel and/or an introduced oxide and/or nitride is in a molar excess, optionally together with further spinel domains of different spinel composition whether stoichiometrically balanced or unbalanced.

22. A particulate material according to claim 21, comprising said particles.

23. A particulate material having a spinel material comprising (1) at least one particle having oxide or nitride that varies from a stoichiometric spinel ratio within the particle, or at least one particle having regions of oxide and nitride that vary from a stoichiometric spinel ratio within the particle, (2) calcium oxide, and (3) at least about 85,000 effective interface and defect zones per surface square millimeter, or at least about 100,000 orientated grain boundaries and microcracks per surface square millimeter, or both, for use in a method according to claim 1.

24. A process of damping vibrations in a metallic substrate comprising coating the metallic substrate with a spinel material, wherein the spinel material comprises
- at least one particle having oxide or nitride that varies from a stoichiometric spinel ratio within the particle, or at least one particle having regions of oxide and nitride that vary from a stoichiometric spinel ratio within the particle,
- calcium oxide, and
- at least about 85,000 effective interface and defect zones per surface square millimeter, or at least about 100,000 orientated grain boundaries and microcracks per surface square millimeter, or both.

* * * * *